March 29, 1938.   P. PASCALE   2,112,505
THROTTLE VALVE FOR LOCOMOTIVES
Filed Sept. 18, 1934
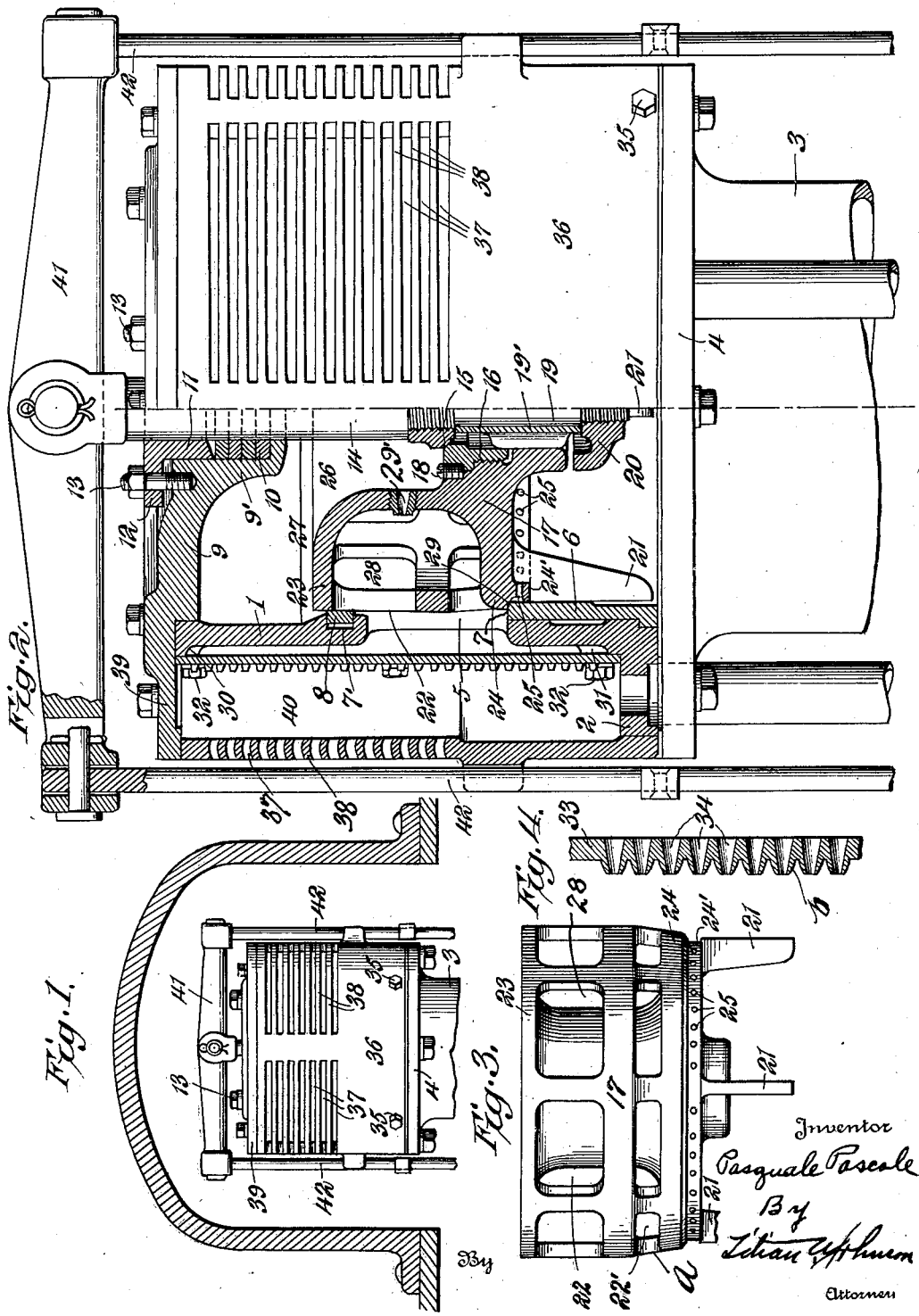

Patented Mar. 29, 1938

2,112,505

UNITED STATES PATENT OFFICE 2,112,505

THROTTLE VALVE FOR LOCOMOTIVES

Pasquale Pascale, New York, N. Y., assignor to Dri-Steam Valve Corporation, New York, N. Y., a corporation of Delaware Application September 18, 1934, Serial No. 744,519

6 Claims. (Cl. 277—37)

This invention relates to a throttle valve for use on locomotives.

The valve is illustrated in connection with a steam drier designed to dry the steam before it passes into the valve. However, it will become apparent further along that the valve can function without the drier, and the drier can function efficiently without the valve. Furthermore, the drier construction only casually described in this application, is the subject matter of another application filed simultaneously herewith.

The object of the present invention, nevertheless, is to provide an adequately balanced valve having in itself structural characteristics that are novel so far as I am aware, and capacitate the valve for easy, smooth operation. An outstanding feature is a means for controlling the pressure beneath the valve disk in the initial opening operation, to prevent the too sudden opening of the valve and the consequent too sudden starting of the engine.

A further object of the invention is to provide a simple means especially useful in the closing operation of the valve and after the pilot valve is closed to build up a pressure of live steam above the valve disk to facilitate the closing of the main valve.

The invention further contemplates a novel means especially useful in the opening operation of the valve for permitting live steam to reach the top of the valve disk to counterbalance the pressure of the steam flowing underneath the valve.

In the drawing illustrating the invention:

Figure 1 is an elevation of the valve;

Figure 2 is an elevation in half section;

Figure 3 is an elevation of the valve disk showing more clearly the means for admitting steam and building up pressure above the valve disk in the closing operation;

Figure 4 is a detail section of a portion of a drier plate.

Referring to the drawing, the numeral 1 designates the valve body formed with an annular flange 2, to which is attached the dry or service pipe 3, which is also flanged as indicated at 4 for the passage of bolts that secure the two parts together. The body is provided with a suitable number of steam ports 5, circularly arranged in its wall. Within the body below the ports, is a valve seat ring 6 provided at its upper edge with a bevelled valve seat 7. Above the ports the body is provided with an annular groove 7' for the reception of a piston ring 8, which, as will appear further along, with the upper portion of the valve disk, constitutes an auxiliary valve, in that a portion of the valve disk slides against it during certain parts of the movement of the valve.

The numeral 9 indicates the valve cover provided centrally with a hollow boss 9' bored to receive packing disks 10 and stuffing box plug 11. This plug is provided with a flange 12 apertured for the passage of short bolts 13 by which the plug is held to the cover. The boss and plug have central openings for the passage of the pilot valve stem 14 which carries pilot valve 15 which seats on the pilot valve seat ring 16 threaded into the valve disk 17, and held therein by set screw 18. The lower end 19 of the pilot valve stem carries the valve lifting bolt 20, the end 19 being guided in sleeve 19', all as more or less common in valves of this character in so far as the pilot valve arrangement is concerned.

However, the differences in construction of the main valve which constitute the novel features of this invention will become apparent. Formed integrally with the under side of the valve disk 17 is a number of legs 21 that slide against the seat ring 6 to insure accurate vertical movement of the valve in opening and closing. The disk is provided in its upper wall with a number of upper steam ports 22 and lower ports 22' and the solid portions of the outer wall right against the piston ring 8 in the opening and closing movements of the valve, the upper edge 23 of the disk contacting with the ring and serves as an auxiliary valve, as before intimated. Just within the outer edge 24 of the lower or seat contacting portion of the valve, it is provided with a downwardly extending flange 24' having therethrough a number of ports or perforations 25 arranged around the flange. These are for the purpose of restricting the area for the passage of live steam and prevent it from rushing too rapidly through the valve in the initial opening movement, thereby enabling the engine to be gradually started.

The valve disk is so shaped as to form a central recess 26 for the reception of the boss 9', and this recess, together with the valve cover and the lower part of the valve 17, forms a comparatively large steam chamber 27. Between the out flaring flange of the upper part of the valve and the lower portion of the valve, another annular chamber 28 is formed and in the wall of this last chamber, I provide a nozzle 29 through which communication between the chambers 27 and 28 is at all times established.

At intervals around the top of the valve body, on the outside thereof, a number of internally threaded bosses 30 are provided, and at the bottom a similar number of the same kind of bosses 31 are placed. These are for the purpose of the attachment by short bolts 32, of a series of drier plates 33 having therethrough and throughout almost their entire surface numerous nozzles 34.

Surrounding the valve body and secured thereto by bolts 35 is a cage or turbine 36, the upper portion of which is provided with numerous vanes 37 spaced apart to form numerous elongated slots or conduits 38. These vanes are arcuate with their entrance ends opening downwardly, and their inner exit ends opening downwardly toward the drier plates, which it will be understood extend entirely around the valve body and are connected therewith in steam tight fashion, so that all steam passing to the valve must pass through the nozzles in the drier plates. The valve cover is provided with an extension 39 which extends over the upper end of the plates and the outer wall of the cage or turbine, thus between the wall of the turbine and the plates a steam chamber 40 is formed.

The upper end of the pilot valve stem is bifurcated and receives the cross arm 41 whose outer ends are connected with valve operating rods 42, suitably guided and connected by a suitable system of linkage which extends through suitable levers to the engine cab or to another point from which it is desired to operate the valve.

It will be understood that the valve as a whole is located in the steam space of a locomotive or other boiler, and steam enters from all sides of the valve simultaneously and its admission to the surface pipe, as will be understood, controlled by the opening and closing movement of the valve. In the present instance, the steam passes through the slits or conduits in the cage and is projected downwardly against the plates and the nozzles thereon, and through the nozzles 29 in the valve into the chamber 27, above the valve, but the steam can go no further until the pilot valve is opened. When this occurs, steam from the chamber 27 flows beneath the valve disk balancing the same and permitting it to be carried up by the lifting bolt 20, the upper edge of the valve disk, meanwhile sliding along the piston ring 8, thus permitting live steam to pass into the chamber 27 to counterbalance the pressure of steam below the valve.

In the closing operation the initial movement of the pilot valve stem brings the pilot valve to its seat and live steam flowing through nozzle 29 having no escape builds up pressure in chamber 27 thereby helping to close the valve.

The initial lifting of the main valve 17 from its seat makes available for a short time, only the ports 25 in the flange 24' on the bottom of the valve through which a quantity of steam passes much short of the quantity that follows on the further unseating of the valve, for the purpose before stated.

Reverting to the structure of the valve disk and calling attention particularly to Figures 2 and 3, it will be noted that the lower portion of the disk is slightly inwardly inclined as indicated at *a*. The shape of this element in this way is to facilitate the insertion or entrance of the valve disk into the valve body in assembling the valve, and in so assembling it, the disk will be introduced into the body before the top of the valve is put in place and the inclined portion of the disk will contact with the piston ring 8 which has previously been placed in its groove and expand the ring to the proper extent. Obviously if the side of the disk were straight or vertical, the ring would prevent the insertion of the disk.

Referring particularly to Figure 4 it will be noted that the nozzles on the drier plates are in the form of truncated cones, slightly rounded toward their entrance ends, thus providing maximum impinging surface for the incoming steam and consequently more effectually denuding the steam of moisture which, as has been stated, is the prime purpose of the nozzles, in conjunction with the slits 37, between the vanes 38.

Having thus described my invention, what I claim is:

1. A valve of the character described including a ported body having a cover and a valve seat in said body, a ported main valve spaced from the cover and slidable in said body and having a portion adapted to seat upon said seat, a pilot valve carried by the main valve, a second valve seat above the ports in the body, a portion carried by the main valve adapted to seat upon said second seat, when the main valve is closed, and adapted to permit the building up of a pressure above the main valve when the pilot valve is open and the main valve raised, to equalize the pressure on opposite sides of the main valve.

2. A valve of the character described including a ported body, a valve seat in said body, a main valve spaced from the cover and having a portion adapted to seat upon said seat, a pilot valve carried by the main valve, a valve seat in said body above the ports formed by an expansible piston ring, a part carried by the main valve cooperating with the piston ring to keep the upper valve closed when the main valve is seated, means carried by the main valve to establish line pressure in the space between the main valve and the cover of the body, when the main valve is seated.

3. A valve of the character described including a ported body having a closed top, a valve seat in the body, a main valve spaced from the top and adapted to seat on the seat, said main valve being formed with inner and outer walls forming an annular chamber, the outer wall being formed with ports open to the ports in the valve body, a second valve seat in the valve body and arranged to be engaged by a portion of the main valve to prevent admission of steam from the ports in the ported body between the main valve and said second seat to the space above said main valve when said main valve is closed, but to permit the entrance of steam above said main valve when said main valve is partially opened, a pilot valve associated with the main valve, means for constantly admitting steam in the space between the cover and the main valve, exerting a tendency to keep the main valve seated when the pilot valve is closed but to allow steam to pass below the main valve upon the opening of the pilot valve to aid in balancing the main valve.

4. A valve of the character described including a ported body having a closed top, a valve seat in the body, a main valve spaced from the top and adapted to seat on the seat, said main valve being formed with inner and outer walls forming an annular chamber, the outer walls being formed with ports open to the ports in the valve body, a second valve seat in the ported body and arranged to be engaged by a portion of the main valve to prevent admission of steam from the ports in the ported body between the main valve and said second seat to the space above said main valve when said main valve is closed, but to permit the entrance of steam above said main valve when said main valve is partially opened, a pilot valve associated with the main valve, a nozzle in the inner wall of the main valve for constantly admitting steam into the space between the main valve and the top of the main body, with a tendency to seat the main valve when the pilot valve is closed.

5. A valve of the character described including a ported body having a closed top, a valve seat in said body, a main valve adapted to seat upon said seat, said valve being formed with inner and outer walls forming an annular chamber, the outer wall being provided with ports open to the ports of the main body, a second valve seat in the ported body arranged to be engaged by a portion of the main valve to prevent the admission of steam from the ports in the ported body between the main valve and second seat when said main valve is closed, but to permit the entrance of steam above said main valve when said main valve is partially opened, a pilot valve associated with the main valve, a flange on the bottom of the main valve and provided with apertures to retard the flow of steam and permit the gradual inflow thereof to the lower side of the main valve, upon the initial opening movement of said main valve.

6. A valve as claimed in claim 3 characterized in that the top and bottom of the ported body are extended beyond said ported body and have formed between them a cage closed at its top by the extended portion of the top of the ported body, the bottom of said cage being formed by the lowermost extension of the ported body, there being in said extension, openings for the drainage of moisture from the cage.

PASQUALE PASCALE.